May 30, 1961 I. E. GOUDE 2,985,898
METHOD OF MAKING A HEADED BOLT BY BRAZING
THE HEAD ON THE BOLT END
Filed May 23, 1955 2 Sheets-Sheet 1

INVENTOR.
IRVING E. GOUDE
BY
Bates, Teare, + McBlow
ATTORNEYS

May 30, 1961  I. E. GOUDE  2,985,898
METHOD OF MAKING A HEADED BOLT BY BRAZING
THE HEAD ON THE BOLT END
Filed May 23, 1955  2 Sheets-Sheet 2

INVENTOR.
IRVING E. GOUDE
BY
Bates, Teare, + McBean
ATTORNEYS

2,985,898

METHOD OF MAKING A HEADED BOLT BY BRAZING THE HEAD ON THE BOLT END

Irving E. Goude, Monrovia, Calif., assignor to
L. M. Pierce

Filed May 23, 1955, Ser. No. 510,071

3 Claims. (Cl. 10—27)

This invention relates to improvements in headed bolts or studs as well as to the process of making the same, and the present application is a continuation in part of my application for Letters Patent of the United States, Serial No. 331,527 for a High Strength Bolt filed January 16, 1953, now abandoned.

For many years, aircraft designers have been seeking the attainment of a high strength bolt or stud which would have the ability to resist fatigue failure without increasing the weight of the fastener and associated structures to an objectionable degree. The original "A.N." Army-Navy specification) bolt with an ultimate tensile test of 125,000 lbs. per square inch (minimum) is relatively simple to manufacture, is low in cost and is not subject in use to fagtigue problems because of the low stress to which it is subjected under load. The problem presented, however, was the attainment of a bolt which would have an ultimate tensile strength of 160,000 lbs. per square inch (minimum), for use in highly pre-loaded joints. In endeavoring to solve the problem, an effort was made to achieve a high tensile strength by the heat treating operation, but the result was that the bolt failed in fatigue at the junction of the head with the shank.

In an attempt to overcome the failure at the junction of the head and shank, a fillet at the junction was suggested, but it was found that the fillet introduced a factor of uneven bearing which necessitated the use of a hardened washer which was countersunk on one side so as to clear the fillet. Tolerances in the manufacture of washers, however, gave rise to uneven joints between the washer and head which further added to the failure at the head. The extent of such failures was so critical that military specifications provided that, in tension fatigue loading, the failure of a bolt at the head end should occur only 25% of the time, and at the nut end 75% of the time. Present high strength bolts cannot meet this requirement. Indeed latest tests show that 85% of failures occur at the head end to 15% at the nut end, but, inasmuch as nothing has been available to obtain the desired degree of strength, the industry has been obliged to use the available bolts by preloading them to a safer torqueing degree. This expedient, however, has increased the weight not only in the bolts, but also in the fittings, with which the bolts are used, and in the associated structures for supporting the fittings.

Some bolt fabricators have achieved a construction which would meet the military requirement pertaining to the relationship percentage-wise of failures at the head and nut end of the bolt, but only on bolts up to ¾" in diameter. The urgent need, however, is for a bolt to meet the aforesaid requirement up to 2⅜" in diameter. The use of bolts, which lack the desired strength, has been necessary in order that aircraft might be fabricated, but the use has occurred with the knowledge that the bolt has a short life under conditions of tension fatigue loading.

The problem of fatigue resistance on bolts which are used in highly stressed joints has increased the cost to an objectionable degree. For example, a single alloy steel bolt 1⅜" in diameter by 6¾" long which would meet a military standard of 160,000 pounds per square inch, ultimate tensile strength, in accordance with Military Specification 20022-76 in small lots would cost $39.00 each. This has been due to the heavy expense in making a one-piece forged or machined bolt, of special alloys, and in the set-up cost for short runs.

An object of the present invention is to make a high strength bolt and a process for making the same, by means of which the desired ultimate tensile strength may be readily obtained, and by means of which the provisions of the military specification, as to the percentage-wise relationship of bolt fatigue failures at the head and nut end can be maintained and at greatly reduced weight and cost of manufacture.

An additional object of the present invention is to attain the desired bolt strength, while still maintaining the dimensions to close tolerances, and to attain the desired ultimate tensile strength in bolts up to any diameter desired for high stress use.

The foregoing objects may be accomplished in one form of the invention by centerless grinding a stud to close tolerances in diameter, by rolling a thread at one end, plating the stud, constructing a head in the form of a nut, threading it to match with the threaded stud. The nut is then plated, and threaded onto the stud, and a washer or collar is pressed onto the stud in tight-fitting engagement with the unthreaded portions thereof and into engagement with a radial face of the nut. The assembly is then passed into an atmosphere controlled brazing oven which is held at a temperature of about 2,100° F. until the plating metal flows and effects a braze between the head and stud. This produces an exceptionally strong joint of an alloy, such as copper-steel, and eliminates the necessity for rolling a fillet at the junction of the flat face of the head and the shank. After the heat treat operation a thread is rolled on the free end of the stud.

Referring to the drawings, Fig. 1 is a front view of a bar from which a bolt embodying the present invention is to be made;

Figs. 2 to 5 inclusive are front views partly in section, showing progressive steps in the making of a bolt in accordance with a modified form of construction;

Figure 1:
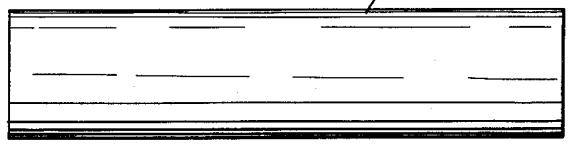
Figure 2:
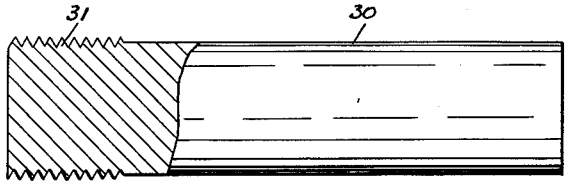
Figure 3:
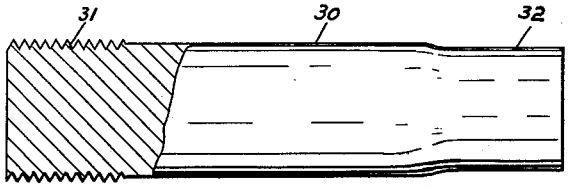

In Figs. 1 to 6, I have shown my invention, wherein Fig. 1 represents a round bar stock 30 which preferably is centerless ground after which one end is cold rolled to provide a relatively fine thread 31 as shown in Fig. 2. By rolling the thread, the outside diameter of the thread will be greater than the outside diameter of the unthreaded shank, while the grain is forced to follow the thread contour thereby avoiding grain discontinuity. In Fig. 3, the end of the shank opposite the thread is reduced in diameter as at 32, preferably by grinding the shank substantially to the pitch diameter of the thread to be used at the end 32.

Figure 4:
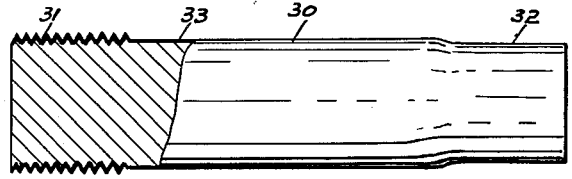
Figure 5:
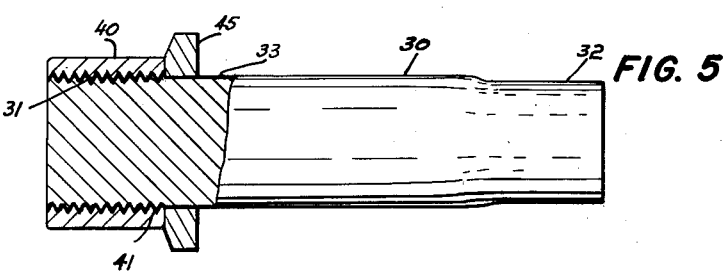
Figure 6:
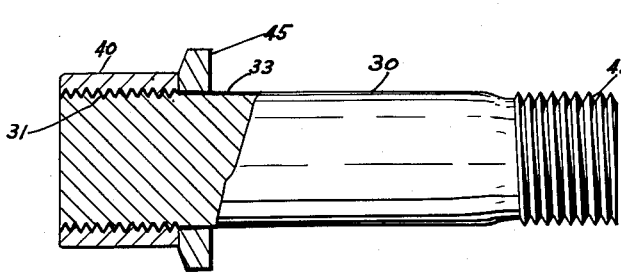
Fig. 6 is a front view, partly in section, showing the final step of a bolt made according to Figs. 2 to 5 inclusive, but with the thread rolled after the heat treat operation to improve the fatigue strength.
Figure 7:
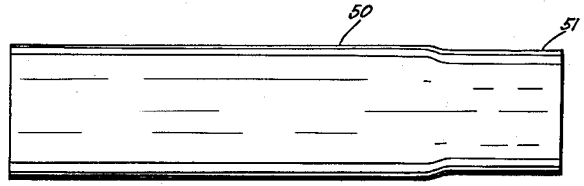
Fig. 7 is a front view of a blank which may be used in making a stud in accordance with the present invention.

Fig. 4 shows the shank of Fig. 3 with a layer of copper plating material 33 thereon and extending for substantially the entire length of the shank. In Fig. 5, a nut 40 is pre-plated with metal such as copper and is threaded onto the shank. A washer or collar 45 has a tight-fitting engagement with the unthreaded portion of the shank and for an axial distance substantially equal to about three threads. Additionally it is pressed against the radial face of the nut.

After the nut and collar have been assembled onto the shank 30, then the unit is inserted into an oven which is held at about 2,100° F. for copper-plate until the parts are brazed together. If desired, instead of electro plating, the brazing metal may be supplied in powder, paste, wire or sheet form and fused in an atmosphere controlled furnace.

After the brazing and heat treating operation has been completed a thread is rolled on the end 32, as at 45 and on the reduced portion of the shank. This thread would usually be an SAE standard thread so that, upon rolling, the metal is extruded outwardly so as to make the outside diameter of the thread approximately equal to the diameter of the unthreaded portion of the shank. This operation cold works the thread and increases the resistance against fatigue failure. There are two to four less threads to the inch on 45 than on 31.

Figure 8:
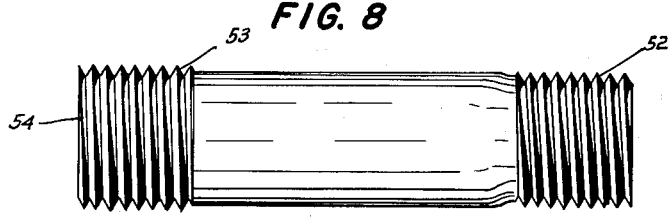
Fig. 8 is a front view of a stud embodying one form of the invention.

In Fig. 12, I have shown a stud 50 with a reduced end portion 51, the diameter of which is approximately equal to the pitch diameter of a thread 52 (Fig. 8), which is subsequently rolled thereon. An oversize thread 53 is also rolled on the end 54, and the rolling action operates to make the pitch diameter of the thread approximately equal to the diameter of the unthreaded portion of the shank. Thus, the root diameter of the thread 53 is larger than the root diameter of the thread 52. This form may be used in making the bolt of Fig. 5, and may also be used as a stud (without a head), but, in the latter case, the end 54 would be threaded into one part to be joined, while a nut would be applied to the thread 52.

Figure 9:
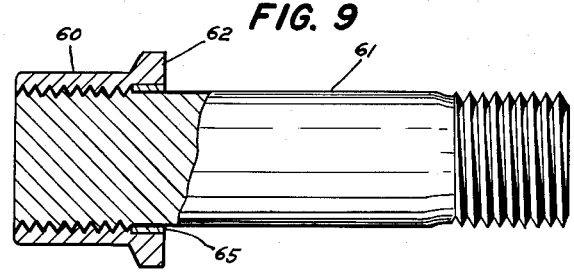
Fig. 9 is a front view partly in section of a further modification of the invention.
Figure 10:
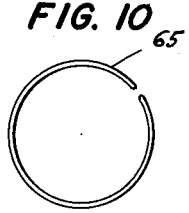
Fig. 10 is an end view of a split ring which is used with the form of Fig. 14.

Fig. 9 shows a modified form of construction wherein a one-piece head 60 is threaded onto the shank 61, but wherein a cylindrical counter-bore 62 overhangs the unthreaded portion of the shank by about three threads, as aforesaid, and is spaced from the shank. The intervening annular space is then occupied by a split ring or collar 65 which is driven into tight-fitting engagement with the shank and head. It is to be understood that in this form, as with the preceding forms, the parts are plated and brazed by heat treat as aforesaid.

A bolt made in accordance with the present invention can readily have the head made from twelve point bar stock and can be made in any desired diameter or length, wherein the parts are capable of being handled in automatic machinery. The bolts have been fabricated to an ultimate tensile strength in excess of 200,000 pounds per square inch and have met the military specifications which specify a failure of only 25% of the time under fatigue loading at the head end of the bolt and 75% of the time through the thread end of the bolt.

An additional advantage is that the invention is capable of use in the formation of bolts having special head shapes, at a greatly reduced cost, and at much lighter weight than heretofore could be obtained. In addition to improvement in performance, the stocking of the head, collar and studs allows rapid manufacturing of short run quantities of special length thus greatly reducing the quantity of finished bolts which must be carried in stock. A further improvement in the manufacturing of bolts is the elimination of grinding after the heat treating operation. Under the present invention the stud is a centerless ground rod wherefore closer tolerances in grinding are possible than could be obtained in the grinding of a bolt having a head and a fillet thereon. The copper plate used for the brazing operation also prevents decarburization during heat treat, another factor which otherwise would greatly reduce fatigue life and strength. The invention is also applicable for use in the manufacture of studs as well as bolts.

A further advantage of the present invention has been a great reduction in the cost per bolt as compared to the example stated, where the cost was approximately $39.00 per bolt. Additionally the present invention enables a bolt of smaller diameter to carry the load of a larger diameter theretofore used, thus enabling a reduction to be made in the weight and cost of the fittings to which the bolts are attached, with a commensurate saving in the weight and cost of structures to which the fittings are applied.

I claim:

1. In a process for making a headed high strength bolt comprising the steps of, taking a cylindrical stud and rolling a thread on one end of said stud so as to make the outside diameter of said thread exceed the diameter of the adjacent unthreaded section of said stud, providing an internally threaded nut member and a coacting collar member for assembly onto said stud, plating said stud and said nut and collar members with brazing metal, assembling said nut and collar members into tight coacting relation on said threaded end of said stud while forcing said collar member into gripping relation with the underlying unthreaded section of said stud and orienting said nut and collar members so that said collar member is disposed in abutting relation with the confronting end of said thread and with the under face of said nut member, said collar member engaging said underlying unthreaded section of said stud for a minimum axial distance of about three threads, and then subjecting the assembly to sufficient heat to braze said stud and said nut and collar members into an integral high strength unit.

2. In a process in accordance with claim 1 including the step of grinding the other end of said stud to produce a reduced diameter portion, and then threading said reduced diameter portion.

3. In a process for making a headed high strength bolt comprising the steps of, taking a cylindrical stud and rolling a thread on one end of said stud so as to make the outside diameter of said thread exceed the diameter of the adjacent unthreaded section of said stud, providing an internally threaded nut member having a counterbore adjacent one end of the threaded section of said nut member, with said counterbore being of a substantially greater diameter than the diameter of said unthreaded section of said stud, providing a collar member for assembly onto said stud and for assembly into coacting relation with said nut member, plating said stud and said nut and collar members with brazing metal, such as copper brazing metal, assembling said nut onto said threaded end of said stud, driving said collar member into said counterbore and into gripping relation with the underlying unthreaded section of said stud while forcing said collar member into abutting relation with the confronting end of said thread on said stud and with the under face of said nut, said collar member engaging said underlying unthreaded section of said stud for a minimum axial distance of about three threads, and then subjecting the assembly to sufficient heat to braze said stud and said nut and collar members into an integral high strength unit.

References Cited in the file of this patent

UNITED STATES PATENTS

| | | | |
|---|---|---|---|
| Re. 19,348 | Kaufman | Oct. | 23, 1934 |
| 446,740 | Jones | Feb. | 17, 1891 |
| 507,974 | Crosby | Oct. | 31, 1893 |
| 1,064,764 | Parker | June | 17, 1913 |
| 1,126,531 | Liebmann | Jan. | 26, 1915 |
| 1,139,479 | Brightman | May | 18, 1915 |
| 1,262,975 | Pierce | Apr. | 16, 1918 |
| 2,145,168 | Flagg | Jan. | 24, 1939 |
| 2,152,102 | Stecher | Mar. | 28, 1939 |
| 2,297,357 | Kelley | Sept. | 29, 1942 |
| 2,322,811 | Ball | June | 29, 1943 |
| 2,383,670 | Moss | Aug. | 28, 1945 |
| 2,421,181 | Batchelder | May | 27, 1947 |
| 2,446,174 | Flynt | Aug. | 3, 1948 |
| 2,528,280 | Lyon | Oct. | 31, 1950 |
| 2,588,372 | Erb | Mar. | 11, 1952 |

FOREIGN PATENTS

| | | | |
|---|---|---|---|
| 190,391 | Great Britain | Dec. | 21, 1922 |
| 220,804 | Switzerland | July | 11, 1942 |
| 554,249 | Great Britain | June | 25, 1943 |